United States Patent [19]
Parrish et al.

[11] 3,725,355
[45] Apr. 3, 1973

[54] RAPID SETTING POLYURETHANE ELASTOMER COMPOSITIONS

[75] Inventors: Donald B. Parrish, Lake Jackson; Franciszek Olstowski, Freeport, both of Tex.

[73] Assignee: The Dow Chemical Company, Midland, Mich.

[22] Filed: Oct. 21, 1971

[21] Appl. No.: 191,344

[52] U.S. Cl..........260/77.5 AP, 252/182, 252/188.3, 260/75 NP, 260/37 N, 260/77.5 AB
[51] Int. Cl.....................C08g 22/10, C08g 22/14
[58] Field of Search...260/77.5 AP, 75 NH; 252/182, 252/188.3, 75 NP

[56] References Cited
UNITED STATES PATENTS

| | | | |
|---|---|---|---|
| 3,216,973 | 11/1965 | Britain | 260/77.5 AP |
| 3,420,796 | 1/1969 | Matsubayashi et al. | 260/77.5 AP |

*Primary Examiner*—Donald E. Czaja
*Assistant Examiner*—M. J. Welsh
*Attorney*—William M. Yates et al.

[57] ABSTRACT

Rapid setting elastomers are prepared by mixing together (A) a polyether or ester modified polyether polyol having a molecular weight of above 2,000, (B) a polyhydroxyl accelerator-extender compound such as glycerine, (C) an isocyanate containing prepolymer, and (D) an organo-metallic catalyst such as lead octoate.

21 Claims, No Drawings

RAPID SETTING POLYURETHANE ELASTOMER COMPOSITIONS

This invention relates to polyurethane elastomers and more particularly concerns polyurethane compositions which rapidly set to form polyurethane cast elastomers and the articles produced thereby.

Polyurethane case elastomers are well known and are fully discussed beginning on page 337 of POLYURETHANES: CHEMISTRY AND TECHNOLOGY, PART II. TECHNOLOGY, Interscience, 1964, by Saunders and Frisch and beginning on page 103 of SOLID POLYURETHANE ELASTOMERS, Maclaren & Sons, London, 1969 by Wright and Cumming.

Although the above reference by Saunders and Frisch is a comprehensive treatise on polyurethane elastomers, there does not appear a discussion on how to prepare fastsetting elastomers, i.e., demoldable within 5 minutes after blending of the components of the elastomer formulation.

It is an object of the present invention to provide fast-setting polyurethane elastomer compositions.

It is a further object to provide polyurethane cast elastomer compositions which can be demolded within about 5 minutes without the application of external sources of heat.

Another object is to prepare bubble-free flexible urethanes without first having to degas or devolatilize the polyol component.

These and other objects will become apparent from a study of the following detailed specification.

The term elastomer as employed throughout this application means those polyurethane products having elongation values of at least 100 percent.

The instant-setting cast polyurethane elastomers of the present invention comprise A. as a polyol, a liquid polyether polyol, ester-containing polyether polyol, or mixtures thereof containing three to four hydroxyl groups per molecule and having a molecular weight of at least about 2,000 and preferably from about 3,000 to about 10,000, B. a liquid accelerator-extender compound selected from the group consisting of glycerine, ethylene glycol, diethylene glycol, triethylene glycol, propylene glycol, dipropylene glycol, tripropylene glycol and an adduct of glycerine or pentaerythritol with a vicinal alkylene oxide or epihalohydrin in a ratio which will provide from one to two moles of alkylene oxide or epihalohydrin per hydroxyl group in the glycerine or pentaerythritol, C. a liquid isocyanate terminated prepolymer which is the reaction product of a stoichiometric excess of a polyisocyanate with a polyhydroxyl-containing compound having a functionality of from two to three and a molecular weight of from about 62 to about 600, said liquid isocyanate terminated prepolymer having an NCO content of at least about 10 percent and less than about 50 percent and preferably from about 15 percent to about 35 percent by weight, and D. an organo metallic catalyst, and wherein components A and B are present in quantities which provide a hydroxyl equivalent ratio of B:A at least about 1:1 and less than about 20:1 and preferably from about 5:1 to about 15:1 and wherein component C is present in a quantity so as to provide an NCO equivalent to OH equivalent ratio contained in components A and B of from about 0.75:1 to about 1.5:1 and preferably from about 0.85:1 to about 1.20:1 and component D is employed in quantities of at least 0.3 percent by weight of the total of components A, B, C and D.

Suitable hydroxyl containing polyether polyols which may be employed as component A of the present invention include the liquid polyether polyols prepared by reacting an initiator compound containing three to four hydroxyl groups with a vicinal epoxide compound or mixture of such compounds and wherein the resultant liquid polyether polyol has a molecular weight at least about 2000 and preferably from about 3,000 to about 10,000.

Suitable initiator compounds containing three to four hydroxyl groups which may be employed in the preparation of the polyether polyols suitable for use as component A include for example compounds such as glycerine, trimethylolpropane, hexane triol, pentaerythritol, β-methyl glycerol, mixtures thereof and the like.

Suitable vicinal epoxide compounds which may be reacted with the above initiator compounds to prepare the polyether polyols employed as component A include, for example, vicinal alkylene oxides, such as, ethylene oxide, 1,2-propylene oxide, 1,2-butylene oxide, 2,3-butylene oxide and the like; halogen substituted alkylene oxides and the like such as, epichlorohydrin, epibromohydrin, epiiodohydrin and the like, substituted alkylene oxides such as styrene oxide and the like. Other compounds include saturated and unsaturated aliphatic glycidyl ethers such as butylglycidyl ether, propylglycidyl ether, allyl glycidyl ether and the like. Mixtures of any of the vicinal epoxide compounds may be employed.

Suitable ester-modified polyether polyols which may be employed as component A include, for example, those compounds represented by the general formula

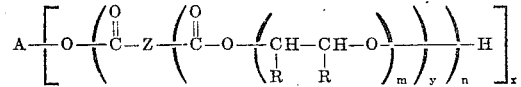

wherein A is the residue of an initiator or starting compound having from 3 to about 4 hydroxyl groups, Z is the residue of an internal anhydride of a saturated or unsaturated acyclic aliphatic, a saturated or unsaturated cyclic aliphatic, or aromatic polycarboxylic acid, halogenated derivatives thereof and mixtures thereof, each R is a substituent independently selected from hydrogen atoms, an alkyl radical having from 1 to 20 carbon atoms, a halomethyl radical, a phenyl radical, and a phenoxymethyl radical, an alkoxymethyl radical with the proviso that one of the R substituents must be hydrogen, $m$ has an average value of from about 1.0 to about 2.0, $n$ has a value from about one to about five, $x$ has a value from about three to about four and $y$ has a value of one or two and wherein said ester-modified polyether compound has a molecular weight of at least about 2,000.

The initiator compounds may be selected from the same group as for the previously described polyether polyols.

These ester-modified polyether polyols are more fully described in a copending application by Robert W. McAda, Jr. entitled "ESTER-MODIFIED POLYETHER POLYOLS," Ser. No. 67,233 filed Aug. 26, 1970.

Suitable polyhydroxyl-containing compounds which may be employed in preparing the liquid isocyanate-containing compound employed as component C are those compounds having from two to about four hydroxyl groups and a molecular weight of at least about 62 and less than about 1,000 and preferably less than about 600 include such compounds as aliphatic compounds containing two to three hydroxyl groups such as, for example, ethylene glycol, propylene glycol, glycerine, trimethylolpropane, hexanediol, hexanetriol, p,p'-isopropylidene-diphenol, p,p'-methylenediphenol, p,p'-isopropylidine dicyclohexanol, p,p'-methylene dicyclohexanol and their reaction products with vicinal epoxides such as ethylene oxide, propylene oxide, 1,2-butylene oxide, 2,3-butylene oxide and mixtures thereof.

Suitable isocyanate compounds which may be employed to prepare the liquid isocyanate-containing compounds employed as component C include, for example, any organic polyisocyanate having 2 NCO groups per molecule and no other substituents capable of reacting with the hydroxyl groups of the polyhydroxyl-containing compound. Suitable such polyisocyanates include, for example, 2,4-toluene-diisocyanate, 2,6-toluenediisocyanate, hexamethylene diisocyanate, p,p'-diphenylmethanediisocyanate, p-phenylenediisocyanate, naphthalene diisocyanate, dianisidine diisocyanate, mixtures of one or more polyisocyanates and the like.

Suitable organo-metallic catalysts which may be employed as component D in the present invention include, for example, organo-metal compounds of tin, zinc, lead, mercury, cadimum, bismuth, antimony and the like such as, for example, metal salts of a carboxylic acid having from about 2 to about 20 carbon atoms including, for example, stannous octoate, dibutyltin dilaurate, dibutyltin diacetate, lead octoate, lead naphthenate, lead oleate, phenylmercuric propionate, mixtures thereof and the like.

It is preferred that the catalysts be employed in liquid form. Those catalysts which are not ordinarily liquids may be added as a solution in a solvent. Suitable such solvents include, for example, diethylene glycol, tripropylene glycol, ethylene glycol, propylene glycol or portions of component A.

Components A and B are employed in quantities so as to provide a hydroxyl equivalent ratio of B:A of greater than 1:1 and less than 20:1. When the ratio is in the upper regions, i.e., about 15:1 to about 20:1 of the limit, the elastomers are somewhat harder and stiffer whereas when the ratio is in the lower regions i.e., about 1:1 to about 5:1 the elastomers are softer and more easily flexed. When the ratio exceeds about 20:1 the products tend to loose their elastomeric properties i.e., their elongation properties tend to fall below values of 100 percent. When the ratio is less than about 1:1, the compositions exhibit extremely poor gellation characteristics, cannot be rapidly demolded without destruction of the resultant casting and yields a product of extremely low mechanical strength.

The isocyanate terminated prepolymer (component C) should have an isocyanate content of at least about 10 percent by weight or greater, preferably between 15 percent and 35 percent but less than about 45 percent. The hydroxyl to isocyanate ratio of components A, B, and C should preferably be between 0.85 and 1.20. When the isocyanate content of the prepolymer is less than about 10 percent, an insufficient exotherm for the reaction will result and the product will not exhibit the "instantly setting" quality (with no external heat applied) that is primarily desired. On the other hand, if the isocyanate fraction of the glycol type prepolymer exceeds substantially 45 percent, the product will tend to yield relatively non-elastomeric, semi-rigid products or the products possess relatively low strength (tear and tensile) properties depending on the mass ratio of "accelerator-extender" to high molecular weight long chain polyether polyol employed.

Furthermore, the polyol or polyhydroxyl containing compound employed in the preparation of the prepolymer, component C, must have a molecular weight of less than 1,000 (preferably substantially less than 1,000 mol. wt.) since it appears that as the molecular weight approaches 1,000, the rate of converting the blend of elastomer ingredients from a liquid to a readily demoldable solid elastomer decreases drastically.

The concentration of the organo-metal catalyst is critical. At least 0.3 weight percent (of total formulation) is required and preferably 0.5 weight percent to 2.0 weight percent is employed. At concentrations of about 0.1 weight percent or less of catalyst in the formulation, the reaction mix will not exhibit the primarily desired "instant" solidification and furthermore, the slower the polymerization rate the more prone is the product to gas cell formation of non-uniform size. Since many of the formulations are opaque, the simplest method of determining void or gas cell generation in the polymer product is to determine the density of the elastomer. Obviously, all other factors being equal, the greater the gas void content of the elastomer casting, the lower will be the strength properties.

The commonly known and used amine type urethane catalysts, such as dimethyl aminoethanol, N-ethyl morpholine, or triethanol amine were not found to be operable when used in the same concentration range as the preferred organo-metallic types. The amine catalysts yielded two types of problems: the fastest catalyst, bis(2-dimethyl-aminoethyl)ether as a 70 percent solution in dipropylene glycol, was too slow for fast demolding purposes and yielded low density elastomers (about 0.6 g/cc) and the amine catalysts that yielded high density castings were slow when compared to the organo metallic types and required many hours for adequate cure to take place.

Minor amounts, i.e., about 2 to about 10 percent by weight of total formulation, of high or low molecular weight hydroxyl terminated polyether or polyester compounds having internal unsaturation bonds or phenyl groups may be added to the formulation to impart other desirable characteristics, such as improved split, tear, or resiliency or improved abrasion resistance in addition to "instant set" characteristics (see Example 14).

Other components including inert fillers such as, for example, sand, microballoons, glass fibers, asbestos, and the like, coloring agents, fire retardant agents, and the like may be employed in the compositions of the present invention without detracting from the scope thereof.

The compositions of the present invention rapidly produce solid elastomeric, essentially bubble free products which may be demolded i.e., the articles produced therefrom may be removed from the mold within about 3 minutes and preferably within about 1 minute or less from the time the mixture is poured into the mold and do not require the application of external sources of heat to accomplish this, although in some circumstances it may be desirable to post cure the products in order to develop certain properties. This is a valuable contribution to the urethane molding art, in that productivity can be increased employing a given quantity of molds.

Suitable materials from which adequate molds, for casting the compositions of the present invention, may be prepared include thermoplastic polymers such as polyethylene, polypropylene, their copolymers and the like, polyurethanes, polysiloxane elastomers, Mylar, cured polyepoxides, relatively thin-walled metal molds, and the like.

The compositions of the present invention are useful as a molding material for preparing elastomeric molds for extremely rapid replication of solid objects by filling these molds with an "instant" set dense rigid formulation as specified in Application Ser. No. 179,149 filed on Sept. 9, 1971 by Franciszek Olstowski and Donald B. Parrish, entitled "Non-Elastomeric Polyurethane Compositions," and as automobile bumpers, elastomeric fluid seals and the like.

The following examples are illustrative of the present invention and are not to be construed as to limiting the scope thereof in any manner.

EXAMPLES 1–16 AND COMPARATIVE EXPERIMENTS 1–14

In the following examples, the components A, B and C were blended together and then component D was blended and the resultant mixture cast in a polyethylene container. The compositions and results are given in the following Table.

In each of the experiments no degassing techniques of any of the components were performed.

| | Example 1 | Comparative experiment 1 | Example 2 | Comparative experiment | | |
|---|---|---|---|---|---|---|
| | | | | 2 | 3 | 4 |
| Component A: | | | | | | |
| Type | CP-4701 [1] | CP-4701 | CP-4701 | CP-4701 | CP-4701 | CP-4701. |
| Grams | 85 | 85 | 85 | 85 | 85 | 85. |
| Component B: | | | | | | |
| Type | Teg [19] | TEG | TEG | TEG | TEG | TEG. |
| Grams | 20 | 20 | 20 | 20 | 20 | 20. |
| Component C: | | | | | | |
| Type | Prepolymer A [2] | Prepolymer A | Prepolymer B [5] | Prepolymer B | Prepolymer B | Prepolymer B. |
| Grams | 100 | 60 | 50 | 50 | 50 | 50. |
| Component D: | | | | | | |
| Type | PbO [3] | PbO | PbO | NIAX-A-1 [6] | DMAE [7] | NEM [8]. |
| Cc | 2 | 0.1 | 1.2 | 2 | 2 | 2. |
| Set time, sec | 25 | L-420 [4] | 30 | >5 min | >2 hrs | >10 min. |
| Demold time, sec | 60 | 20 min | | | | |
| Density, g./cc | 1.089 | 0.856 | >1.0 | 0.662 | 0.978 | 0.88. |

NOTE.—See footnotes at end of tables.

| | Comparative experiment | | Example | | | |
|---|---|---|---|---|---|---|
| | 5 | 6 | 3 | 4 | 5 | 6 |
| Component A: | | | | | | |
| Type | CP-4701 | CP-4701 | CP-4701 | CP-4701 | CP-4701 | CP-4701. |
| Grams | 85 | 85 | 85 | 85 | 85 | 85. |
| Component B: | | | | | | |
| Type | TEG | TEG | EG [11] | DEG [12] | PG [13] | DPG [14]. |
| Grams | 20 | 20 | 8 | 8 | 8 | 8. |
| Component C: | | | | | | |
| Type | Prepolymer B | Prepolymer B | Prepolymer B | Prepolymer B | Prepolymer B | Prepolymer B. |
| Grams | 50 | 50 | 50 | 50 | 50 | 50. |
| Component D: | | | | | | |
| Type | TMBDA [9] | TEA [10] | PbO | PbO | PbO | PbO. |
| Cc | 2 | 2 | 1.2 | 1.2 | 1.2 | 1.2. |
| Set time, sec | >2 hrs | >2 hrs | 30 | 20 | 20 | <2 min. |
| Demold time, sec | N.D | N.D | <60 | N.D | N.D | N.D. |
| Density, g./cc | 0.56 | 0.9 | >1 | >1 | >1 | >1. |

NOTE.—See footnotes at end of tables.

| | Example | | | | Comparative experiment | |
|---|---|---|---|---|---|---|
| | 7 | 8 | 9 | 10 | 7 | 8 |
| Component A: | | | | | | |
| Type | CP-4701 | CP-4701 | CP-4701 | CP-4701 | CP-4701 | CP-4701. |
| Grams | 85 | 85 | 85 | 85 | 85 | 85. |
| Component B: | | | | | | |
| Type | TPG [15] | Glycerine | CP-260 [16] | Pent-PO [17] | Tet EG [18] | BDO [20]. |
| Grams | 8 | 8 | 8 | | 20 | 20. |
| Component C: | | | | | | |
| Type | Prepolymer B | Prepolymer B | Prepolymer B | Prepolymer B | Prepolymer B | Polymer B. |
| Grams | 50 | 50 | 50 | 50 | 50 | 50. |
| Component D: | | | | | | |
| Type | PbO | PbO | PbO | PbO | PbO | PbO. |
| Cc | 1.2 | 1.2 | 1.2 | 1.2 | 1.2 | 1.2. |
| Set time, sec | 30 | 80 | 25 | <60 | >2 hrs | >2 hrs. |
| Demold time, sec | N.D | N.D | N.D | N.D | N.D | N.D. |
| Density, g./cc | >1 | >1 | >1 | >1 | >1 | >1. |

NOTE.—See footnotes at end of tables.

| | Comparative experiment | | | Example 11 | Comparative experiment 12 | Example 12 |
|---|---|---|---|---|---|---|
| | 9 | 10 | 11 | | | |
| Component A: | | | | | | |
| Type | CP-4701 | CP-4701 | CP-4701 | CP-4701 | CP-4701 | CP-3000.26 |
| Grams | 85 | 85 | 85 | 85 | 85 | 30. |
| Component B: | | | | | | |
| Type | PDO 21 | TMP 22 | HDA 23 | TEG | TEG | DPG. |
| Grams | 20 | 20 | 20 | 20 | 20 | 9. |
| Component C: | | | | | | |
| Type | Prepolymer B | Prepolymer B | Prepolymer B | Prepolymer C 24 | Prepolymer D 25 | Prepolymer B. |
| Grams | 50 | 50 | 50 | 80 | 65 | 25. |
| Component D: | | | | | | |
| Type | PbO | PbO | PbO | PbO | PbO | PbO. |
| Cc | 1.2 | 1.2 | 1.2 | 2 | 2 | 0.5 |
| Set time, sec | 1 hr | >5 min | >2 hrs | 30 | 180 | 20. |
| Demold time, sec | | | | >60 | 9 min | |
| Feel after demolding | | | | N.T | T | |
| Density, g./cc | >1 | >1 | >1 | >1 | >1 | >1. |

NOTE.—See footnotes at end of tables.

| | Example | | | Comparative experiment 13 | Example 16 | Comparative experiment 14 |
|---|---|---|---|---|---|---|
| | 13 | 14* | 15** | | | |
| Component A: | | | | | | |
| Type | CP-4701 | CP-4701+BA-EO 28 (26). | CP-4701 | CP-4701 | D-3900 29 | D-3900. |
| Grams | 85 | 146 | 60 | 20 | 42 | 85. |
| Component B: | | | | | | |
| Type | TEG | DEG | DEG | DEG | TEG | TEG. |
| Grams | 10 | 27.6 | 20 | 13 | 10 | 20. |
| OH equiv. ratio of B:A | | | 10:1 | 20:1 | | |
| Component C: | | | | | | |
| Type | Prepolymer B | Prepolymer B | Prepolymer B | Prepolymer B | Prepolymer B | Prepolymer B. |
| Grams | 25 | 100 | 44 | 35 | 25 | 50. |
| Component D: | | | | | | |
| Type | DBTDL 27 | DBTDL | PbO | PbO | PbO | PbO. |
| Cc | 1 | 3 | 1.5 | 1 | 0.5 | 0.2. |
| Set tim, sec | 25 | 15 | 15 | 15 | 25 | >12 min. |
| Demold time, sec | N.D | N.D | 60 | 60 | 60 | >35 min. |
| Density, g./cc | N.D | N.D | N.D | N.D | 1.05 | 0.34. |
| Ultimate tensile strength, p.s.i. | N.D | 2,660 | 1,210 | N.D | 1,020 | 137. |
| Percent elongation | N.D | 160 | 519 | 50 | 145 | N.D. |
| Graves tear strength (Die C) | N.D | 390 | 276 | N.D | 175 | N.D. |
| Hardness, Shore D | N.D | 49 | N.D | N.D | N.D | N.D. |

1 Voranol® CP-4701 is a glycerine initiated polyoxypropylene glycol end capped with ethylene oxide having a percent OH of about 0.96 to about 1.10.
2 Prepolymer A is the reaction product of dipropylene glycol with toluenediisocyanate (80/20 mixture of the 2,4- and 2,6-isomers) said prepolymer having a percent NCO of about 25.7.
3 PbO is a lead octoate catalyst containing 24% lead by weight (density=1.11 g./cc.).
4 Mixture was still liquid after 420 seconds.
5 Prepolymer B is the reaction product of Voranol® CP-260 16 and toluene diisocyanate having an NCO content of 31.8% by weight.
6 Niax® A-1 is bis(2-dimethyl aminoethyl)ether as a 70% solution in dipropylene glycol.
7 DMAE is dimethylaminoethanol.
8 NEM is N-ethylmorpholine.
9 TMBDA is tetramethylbutanediamine.
10 TEA is triethanolamine.
11 EG is ethylene glycol.
12 DEG is diethylene glycol.
13 PG is 1,2-propylene glycol.
14 DPG is dipropylene glycol.
15 TPG is tripropylene glycol.
16 Voranol® CP-260 is the reaction product of glycerine with propylene oxide having a percent OH of 19.5 to 20.5.
17 Pent PO is the reaction product of pentaerythritol with propylene oxide in a mole ratio of 1 to 5 respectively.
18 Tet EG is tetraethylene glycol.
19 TEG is triethylene glycol.
20 BDO is 1,4-butanediol.
21 PDO is 1,5-pentanediol.
22 TMP is trimethylolpropane.
23 HDA is 1,6-hexanediol.
24 Prepolymer C is the reaction product of toluene diisocyanate (80/20 mixture of 2,4- and 2,6-isomers) with a novolac polyol which is the reaction product of a 2.3 functional acid catalyzed phenol-formaldehyde condensate with 4 moles of ethylene oxide per phenolic hydroxide, said prepolymer having an NCO content of 20.1% by weight.
25 Prepolymer D is the reaction product of a 1,000 molecular weight polyoxypropylene glycol with toluene diisocyanate (80/20 mixture of 2,4- and 2,6-isomers) said prepolymer having an NCO content of 23.1% by weight.
26 Voranol® CP-3000 is the reaction product of glycerine with propylene oxide having an OH equivalent weight of about 1,000.
27 DBTDL is dibutyltindilaurate.
28 BA-EO is the reaction product of p,p'-isopropylidinediphenol with ethylene oxide in a molar ratio of 1 to 6 respectively.
29 Desmophen® 3900 is a polyether triol having a hydroxyl equivalent weight of 1,604.
30 N.D. means the value was not determined.
*Composition was cast between two waxed stainless steel plates.
**Composition was cast onto a Mylar® sheet.

We claim:
1. Urethane elastomer having a density of at least about 1 gram/cc which is the reaction product of a rapid setting composition comprising
    A. a liquid polyether or ester-modified polyether polyol containing three to four hydroxyl groups per molecule and a molecular weight of at least about 2,000,
    B. a liquid accelerator-extender compound selected from the group consisting of glycerine, ethylene glycol, diethylene glycol, triethylene glycol, propylene glycol, dipropylene glycol, and the reaction product of glycerine or pentaerythritol with an alkylene oxide or an epihalohydrin in a ratio that will provide from one to about two moles of alkylene oxide or epihalohydrin per hydroxyl group contained in the glycerine or pentaerythritol,
    C. a liquid isocyanate terminated prepolymer which is the reaction product of a stoichiometric excess of a polyisocyanate with a polyhydroxyl-containing compound having a hydroxyl functionality of from 2 to about 3 and a molecular weight of from about 62 to about 600, said prepolymer having an NCO content of at least about 10 percent and less than about 50 percent by weight, and
    D. an organo-metallic catalyst, wherein components A and B are present in quantities which provide a hydroxyl equivalent ratio of B:A of at least about 1:1 and less than about 20:1, component C is present in a quantity so as to provide an NCO equivalent to OH equivalent contained in components A and B of from about 0.75:1 to about 1.5:1 and component D is employed in quantities of at least 0.3 percent by weight of the sum of the weights of components A + B + C + D.

2. The composition of claim 1 wherein component A has a molecular weight of from about 3,000 to about 10,000, component C has an NCO content of from about 15 to about 35 percent by weight, the hydroxyl equivalent ratio of B:A is from about 5:1 to about 15:1 and wherein component C is present in quantities which provide from about 0.85 to about 1.20 NCO equivalents per hydroxyl equivalent contained in components A and B.

3. The composition of claim 2 wherein component B is diethylene glycol.

4. The composition of claim 2 wherein component B is triethylene glycol.

5. The composition of claim 2 wherein component B is glycerine.

6. The composition of claim 2 wherein component B is propylene glycol.

7. The composition of claim 2 wherein component B is the reaction product of glycerine or pentaerythritol with an alkylene oxide.

8. The composition of claim 7 wherein component B is the reaction product of glycerine with propylene oxide and having a percent OH of from about 19.5 to about 20.5.

9. The composition of claim 7 wherein component B is the reaction product of pentaerythritol with propylene oxide in a molar ratio of 1 to 5 respectively.

10. The composition of claim 2 wherein component A is a glycerine initiated polyoxypropylene glycol end capped with ethylene oxide having a percent OH of about 0.96 to about 1.10.

11. The composition of claim 2 wherein component C is the reaction product of dipropylene glycol with toluene-diisocyanate, said prepolymer having an NCO content of about 25.7 percent.

12. The composition of claim 2 wherein component C is the toluene diisocyanate adduct of the reaction product of glycerine and propylene oxide having a percent OH of from about 19.5 to about 20.5, said prepolymer having an NCO content of about 31.8 percent.

13. The composition of claim 2 wherein component D is a metal i.e., salt of a carboxylic acid having from about 2 to about 20 carbon atoms.

14. The composition of claim 13 wherein component D is an organo-lead compound.

15. The composition of claim 14 wherein component D is lead-octoate.

16. The composition of claim 13 wherein component D is an organo-tin compound.

17. The composition of claim 16 wherein component D is dibutyltindilaurate.

18. The articles resulting from casting the compositions of claim 1 in a suitable mold.

19. The articles resulting from casting the compositions of claim 2 in a suitable mold.

20. A composition which reacts in the presence of an organometallic catalyst to produce a rapid setting urethane elastomer composition and which comprises:

A. a liquid polyether or ester-modified polyether polyol containing three to four hydroxyl groups per molecule and a molecular weight of at least about 2,000, B. a liquid accelerator-extender compound selected from the group consisting of glycerine, ethylene glycol, diethylene glycol, triethylene glycol, propylene glycol, dipropylene glycol, and the reaction product of glycerine or pentaerythritol with an alkylene oxide or an epihalohydrin in a ratio that will provide from one to about two moles of alkylene oxide or epihalohydrin per hydroxyl group contained in the glycerine or pentaerythritol, C. a liquid isocyanate terminated prepolymer which is the reaction product of a stoichiometric excess of a polyisocyanate with a polyhydroxyl-containing compound having a hydroxyl functionality of from two to about three and a molecular weight of from about 62 to about 600, said prepolymer having an NCO content of at least about 10 percent and less than about 50 percent by weight, wherein components A and B are present in quantities which provide a hydroxyl equivalent ratio of B:A of at least about 1:1 and less than about 20:1; component C is present in a quantity so as to provide an NCO equivalent to OH equivalent contained in components A and B of from about 0.75:1 to about 1.5:1.

21. The composition of claim 20 wherein component A has a molecular weight of from about 3,000 to about 10,000, component C has an NCO content of from about 15 to about 35 percent by weight, the hydroxyl equivalent ratio of B:A is from about 5:1 to about 15:1 and wherein component C is present in quantities which provide from about 0.85 to about 1.20 NCO equivalents per hydroxyl equivalent contained in components A and B.

* * * * *